(12) United States Patent
Mercat et al.

(10) Patent No.: US 12,269,245 B2
(45) Date of Patent: Apr. 8, 2025

(54) ACOUSTIC TREATMENT PANEL COMPRISING ACOUSTIC CELLS OF DIFFERENT VOLUMES OBTAINED FROM CYLINDRICAL AND IDENTICAL MAIN TUBES, AIRCRAFT COMPRISING SUCH AN ACOUSTIC TREATMENT PANEL

(71) Applicant: Airbus Operations SAS, Toulouse (FR)

(72) Inventors: Florent Mercat, Toulouse (FR); Florian Ravise, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 320 days.

(21) Appl. No.: 17/940,077

(22) Filed: Sep. 8, 2022

(65) Prior Publication Data

US 2023/0088770 A1    Mar. 23, 2023

(30) Foreign Application Priority Data

Sep. 20, 2021   (FR) ..................................... 2109841

(51) Int. Cl.
  *G10K 11/172*   (2006.01)
  *B32B 3/12*   (2006.01)
  (Continued)

(52) U.S. Cl.
  CPC ............... *B32B 3/12* (2013.01); *B64D 33/06* (2013.01); *G10K 11/168* (2013.01); *B32B 2307/102* (2013.01); *B32B 2605/18* (2013.01)

(58) Field of Classification Search
  CPC .... G10K 11/168; G10K 11/172; G10K 11/02; G10K 11/161; G10K 11/16; B32B 3/12;
  (Continued)

(56) References Cited

U.S. PATENT DOCUMENTS 3,429,397 A * 2/1969 Case ....................... F01N 1/023
                                                        181/227
3,645,357 A * 2/1972 Cassel ....................... F01N 1/02
                                                        181/227
(Continued)

FOREIGN PATENT DOCUMENTS

CN     104890308 A  *  9/2015  ............... B32B 1/00
CN     109584855 A  *  4/2019  ........... G10K 11/162
(Continued)

OTHER PUBLICATIONS

French Search Report; priority document, May 2022.

*Primary Examiner* — Edgardo San Martin
(74) *Attorney, Agent, or Firm* — Greer, Burns & Crain, Ltd.

(57) ABSTRACT

An acoustic treatment panel includes at least one acoustically resistive layer, a reflective layer and at least one cellular structure interposed between the acoustically resistive layer and the reflective layer. The cellular structure includes cylindrical and identical main tubes which are closed at one end by the acoustically resistive layer and at the other end by the reflective layer, spacer zones between the main tubes, the spacer zones being sealed relative to one another, cutouts made at an end of certain main tubes, in contact with the reflective layer, and/or secondary tubes positioned in the main tubes and/or in the spacer zones, the cutouts and/or the secondary tubes being configured to generate acoustic cells of different dimensions from identical main tubes.

10 Claims, 4 Drawing Sheets

(51) Int. Cl.
*B64C 1/40* (2006.01)
*B64D 33/02* (2006.01)
*B64D 33/04* (2006.01)
*F02K 1/82* (2006.01)
*G10K 11/168* (2006.01)

(58) Field of Classification Search
CPC .......... B32B 3/26; B64D 33/02; B64D 33/04; B64D 33/06; B64D 2033/0206; F02K 1/82; F02K 1/827; B64C 1/40
See application file for complete search history.

(56) References Cited

U.S. PATENT DOCUMENTS

| | | | | |
|---|---|---|---|---|
| 3,769,767 | A * | 11/1973 | Scott | E04C 2/365 52/145 |
| 3,887,031 | A * | 6/1975 | Wirt | G10K 11/172 181/292 |
| 4,001,473 | A * | 1/1977 | Cook | B32B 3/266 428/116 |
| 4,106,587 | A * | 8/1978 | Nash | F02K 1/827 181/290 |
| 4,231,447 | A * | 11/1980 | Chapman | G10K 11/172 181/294 |
| 5,445,861 | A * | 8/1995 | Newton | G10K 11/172 428/116 |
| 6,352,134 | B1 * | 3/2002 | Wang | E04B 9/34 181/292 |
| 6,569,509 | B1 | 5/2003 | Alts | |
| 6,615,950 | B2 * | 9/2003 | Porte | G10K 11/172 181/290 |
| 7,413,053 | B2 * | 8/2008 | Wasif | F23M 20/005 181/292 |
| 8,464,831 | B2 * | 6/2013 | Olander Burak | F01D 9/041 181/290 |
| 9,909,471 | B2 * | 3/2018 | Mattia | F01N 1/082 |
| 10,836,502 | B2 * | 11/2020 | Gakhar | B64D 33/02 |
| 10,940,935 | B2 * | 3/2021 | Porte | G10K 11/172 |
| 11,208,193 | B2 * | 12/2021 | Ravise | G10K 11/168 |
| 11,426,968 | B2 * | 8/2022 | Ravise | B32B 3/30 |
| 11,780,384 | B2 * | 10/2023 | Fukumoto | G10K 11/168 181/290 |
| 2020/0165975 | A1 | 5/2020 | Brochard et al. | |

FOREIGN PATENT DOCUMENTS

| | | | | |
|---|---|---|---|---|
| CN | 107023743 B | * | 8/2019 | ............ F16S 3/02 |
| CN | 110576643 A | * | 12/2019 | |
| CN | 111048059 A | * | 4/2020 | |
| CN | 111785242 A | * | 10/2020 | |
| CN | 111798825 A | * | 10/2020 | ......... G10K 11/172 |
| CN | 213733770 U | * | 7/2021 | |
| CN | 114255722 A | * | 3/2022 | |
| CN | 115602142 A | * | 1/2023 | |
| EP | 3871875 A1 | * | 9/2021 | |
| FR | 3088658 A1 | | 5/2020 | |

* cited by examiner

ACOUSTIC TREATMENT PANEL COMPRISING ACOUSTIC CELLS OF DIFFERENT VOLUMES OBTAINED FROM CYLINDRICAL AND IDENTICAL MAIN TUBES, AIRCRAFT COMPRISING SUCH AN ACOUSTIC TREATMENT PANEL

CROSS-REFERENCES TO RELATED APPLICATIONS

This application claims the benefit of the French patent application No. 2109841 filed on Sep. 20, 2021, the entire disclosures of which are incorporated herein by way of reference.

FIELD OF THE INVENTION

The present application relates to an acoustic treatment panel comprising acoustic cells of different volumes obtained from cylindrical and identical main tubes, and also to an aircraft comprising such an acoustic treatment panel.

BACKGROUND OF THE INVENTION

According to an embodiment visible in FIG. 1, an acoustic treatment panel 10 comprises at least one cellular structure 12 positioned between an impermeable reflective layer 14 and a porous acoustically resistive layer 16 in contact with an exterior environment in which sound waves propagate. The cellular structure 12 comprises a plurality of cells, which each form an approximately sealed acoustic cell. In addition, the acoustically resistive layer 16 comprises a plurality of through-orifices configured to allow the exterior environment to communicate with one of the acoustic cells.

According to one application, this type of panel is positioned in a nacelle of an aircraft so as to attenuate the noises coming from a jet engine.

According to one configuration visible in FIG. 1, the cellular structure 12 comprises hexagonal cells 18 butting against one another, without any gaps between them. The cells 18 all have the same dimensions.

Such an acoustic treatment panel 10 makes it possible to attenuate sound waves over a limited range of frequencies, as a function of the dimensions of the cells 18 and more particularly the height of the cells 18. By way of example, for a given height of between 25 and 40 mm, the acoustic treatment panel makes it possible to attenuate sound waves over a limited range of frequencies, around a high frequency of between 1000 Hz and 2000 Hz.

This embodiment is not satisfactory because such a panel permits an acoustic treatment only over a limited range of frequencies.

The present invention seeks to remedy all or some of the drawbacks of the prior art.

SUMMARY OF THE INVENTION

To that end, a subject of the invention is an acoustic treatment panel comprising at least one porous acoustically resistive layer, an impermeable reflective layer and at least one cellular structure interposed between the acoustically resistive layer and the reflective layer.

According to the invention, the cellular structure comprises cylindrical and identical main tubes which have a first end closed by the acoustically resistive layer and a second end closed by the reflective layer, the main tubes being arranged so as to delimit between them spacer zones which are sealed relative to one another. In addition, the cellular structure comprises:

cutouts made at an end of certain main tubes, in contact with the reflective layer, and/or
secondary tubes positioned in the main tubes and/or in the spacer zones,
the cutouts and/or the secondary tubes being configured to generate acoustic cells of different dimensions from identical main tubes.

Thus, it is possible to widen the range of frequencies attenuated by the acoustic treatment panel.

According to another feature, the secondary tubes comprise cylindrical open tubes positioned in the spacer zones, each open tube having a first open end in contact with the acoustically resistive layer and a second open end spaced apart from the reflective layer.

According to another feature, the main tubes have a diameter of between 10 and 20 mm and a height of between 25 and 40 mm. In addition, the open tubes have a diameter of between 0.3 and 1 mm and a height of between 5 and 25 mm.

According to another feature, the secondary tubes comprise cylindrical closure tubes positioned in the spacer zones, each closure tube having at least one end closed by a transverse surface pressed against the acoustically resistive layer.

According to another feature, the acoustically resistive layer has through-orifices over an entire zone situated in line with at least one spacer zone comprising an open tube, the number and dimensions of the closure tubes positioned in the spacer zone being determined in such a way that the through-orifices situated in that zone of the acoustically resistive layer which is situated in line with the spacer zone and which is offset with respect to the open tube are closed off by the transverse surface or surfaces of the closure tube or tubes.

According to another feature, the secondary tubes comprise at least one cylindrical closed tube which is closed off at each of its ends and which is positioned in a main tube or in a spacer zone, the closed tube having dimensions determined as a function of the volume desired for the main tube or the spacer zone in which it is situated.

According to another feature, the closed tube has an end pressed against the acoustically resistive layer or the reflective layer.

According to another feature, the secondary tubes comprise at least one cylindrical resonator tube which is positioned in a spacer zone, and which has an open first end connected to the acoustically resistive layer, and a closed-off second end.

According to another feature, the main tubes are arranged in alternating fashion in several rows, each main tube being connected by a cutout to a spacer zone. In addition, the acoustically resistive layer has through-orifices solely in line with one out of every two main tubes for each row.

According to another feature, the main tubes are arranged in alternating fashion in several rows, the acoustically resistive layer having at least one through-orifice in line with each spacer zone and through-orifices solely in line with one out of every two main tubes for each row, at least one spacer zone being connected by a cutout to a main tube situated in line with through-orifices of the acoustically resistive layer, at least one spacer zone being connected by a cutout to a main tube situated in line with a non-perforated zone of the acoustically resistive layer, at least one spacer zone not communicating with any main tubes.

According to another feature, the main tubes are arranged in rows and columns perpendicular to the rows, the acoustically resistive layer comprising through-orifices in line with all of the main tubes of all of the even-numbered rows and none in line with any of the main tubes of the odd-numbered rows. In addition, an open tube is positioned in each spacer zone, the cutouts being oblique grooves allowing a spacer zone, a main tube in line with which through-orifices are provided, a spacer zone and a main tube in line with a non-perforated zone of the acoustically resistive layer to communicate successively.

Another subject of the invention is an aircraft comprising at least one acoustic treatment panel according to one of the preceding features.

BRIEF DESCRIPTION OF THE DRAWINGS

Other features and advantages will become apparent from the following description of the invention, which description is given solely by way of example, with reference to the appended drawings in which.

DETAILED DESCRIPTION OF THE PREFERRED EMBODIMENTS

Figure 1:
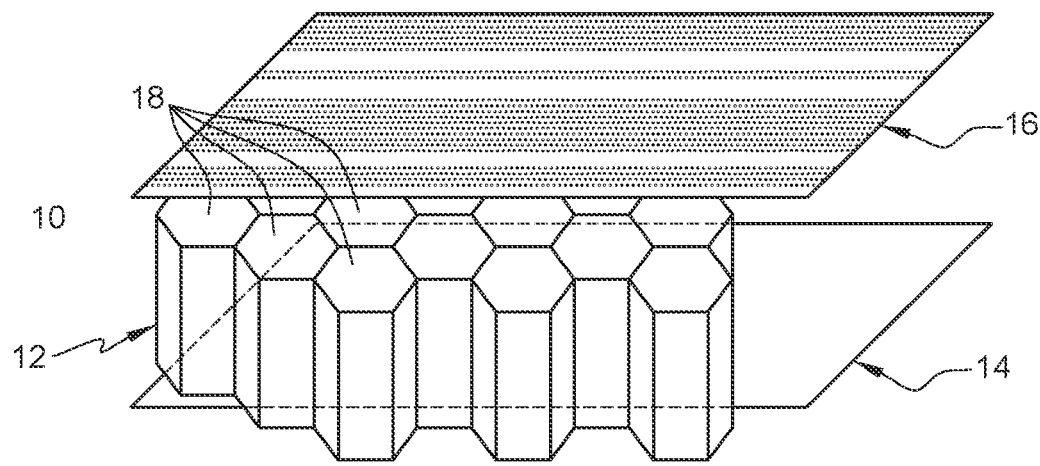
FIG. 1 is a perspective view of an acoustic treatment panel illustrating an embodiment of the prior art.

According to different embodiments visible in FIGS. 2 to 10, an acoustic treatment panel 20 comprises at least one porous acoustically resistive layer 22 which has first and second faces 22.1, 22.2, the first face 22.1 being in contact with an exterior environment in which sound waves propagate, an impermeable reflective layer 24 which has first and second faces 24.1, 24.2, the second face 24.2 being oriented toward the acoustically resistive layer 22, and at least one cellular structure 26 interposed between the acoustically resistive layer 22 and the reflective layer 24.

According to one configuration, the acoustically resistive layer 22 and the reflective layer 24 are parallel to one another. To simplify the figures, these two layers 22 and 24 are represented as planar. Generally, they are curved. According to one operational embodiment, the different layers may be produced flat and be shaped before or after the assembly.

For the remainder of the description, a first direction is a direction perpendicular to the acoustically resistive layer 22 and to the reflective layer 24.

The acoustically resistive layer 22 and the reflective layer 24 may be metallic or made of composite material. They may each comprise one or more superposed layers.

The cellular structure 26 comprises a plurality of main tubes 28 having a first end in contact with the second face 22.2 of the acoustically resistive layer 22 and connected thereto, and a second end in contact with the second face 24.2 of the reflective layer 24 and connected thereto. Thus, each main tube 28 is closed off at its first end by the acoustically resistive layer 22 and at its second end by the reflective layer 24.

The main tubes 28 are aligned in several rows.

According to a first arrangement visible in FIGS. 2, 3, 8 and 9, the main tubes 28 of the different rows are arranged in alternating fashion. In this case, the main tubes 28 are each in contact with six other main tubes 28.

According to a second arrangement visible in FIGS. 4, 6, 7 and 10, the main tubes 28 are not arranged in alternating fashion and are each in contact with four other main tubes 28.

According to one configuration, each main tube 28 is cylindrical and has an axis perpendicular to the acoustically resistive layer 22 or to the reflective layer 24. The main tubes 28 all have the same diameter of between 10 and 20 mm and the same height of between about 25 to 40 mm By way of example, the main tubes 28 have a diameter of the order of 10 mm. In this case, as a function of their height (distance separating their first and second ends), these main tubes 28 are designed to attenuate sound waves having a frequency of between 1000 and 2000 Hz, corresponding to a high frequency.

Irrespective of the arrangement of the main tubes 28, the cellular structure 26 has spacer zones 30 which are situated between the main tubes 28 and which extend between the acoustically resistive layer 22 and the reflective layer 24. Each spacer zone 30 is delimited by several main tubes 28 (three or four as a function of the arrangement of the main tubes 28) which are connected in pairs at contact zones 32. Each contact zone 32 is sealed and extends from the acoustically resistive layer 22 as far as the reflective layer 24. Thus, the spacer zones 30 are sealed and isolated from one another.

Figure 10:
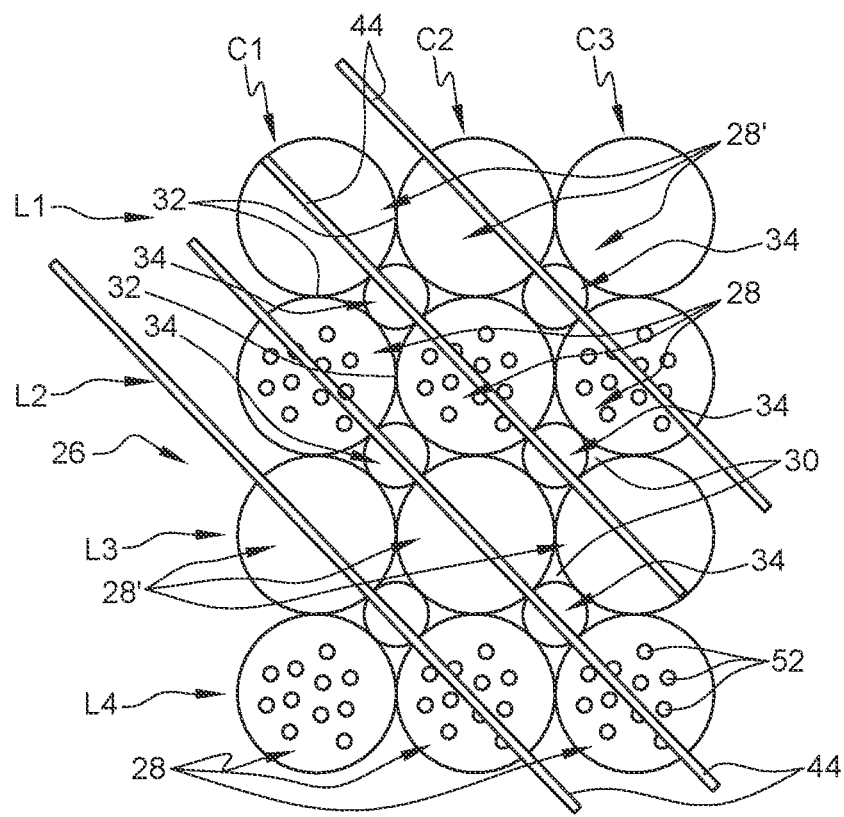
FIG. 10 is a view from above of an acoustic treatment panel illustrating another embodiment of the invention.

The spacer zones 30 each have a volume which varies as a function of the arrangement of the main tubes 28, this volume being smallest when the main tubes 28 are arranged in alternating fashion, and largest when the main tubes are arranged in rows and columns perpendicular to the rows, as illustrated in FIG. 10.

Figure 2:
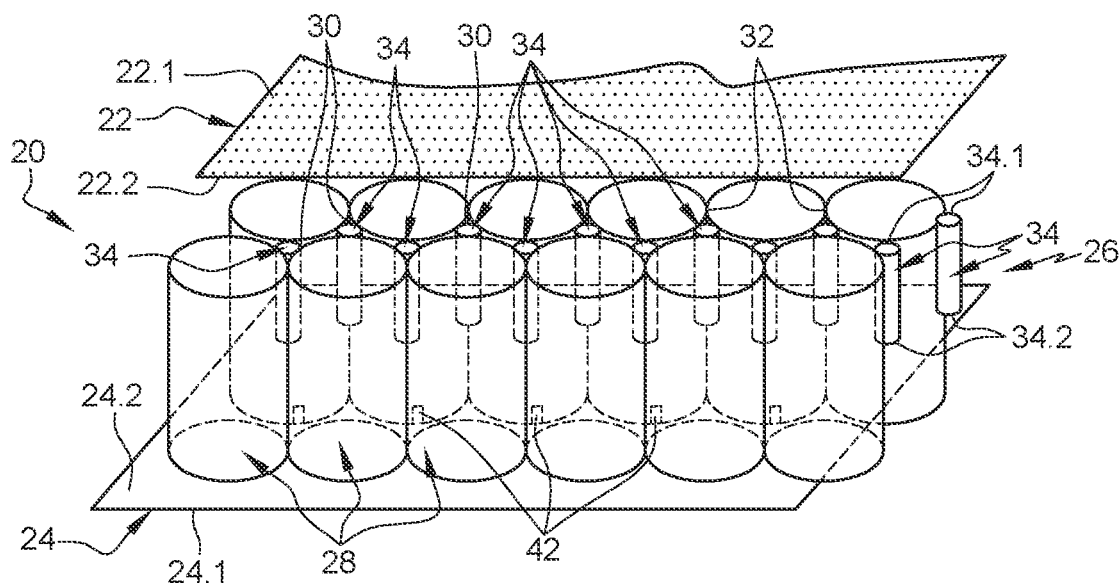
FIG. 2 is a perspective view of an acoustic treatment panel illustrating one embodiment of the invention.
Figure 3:
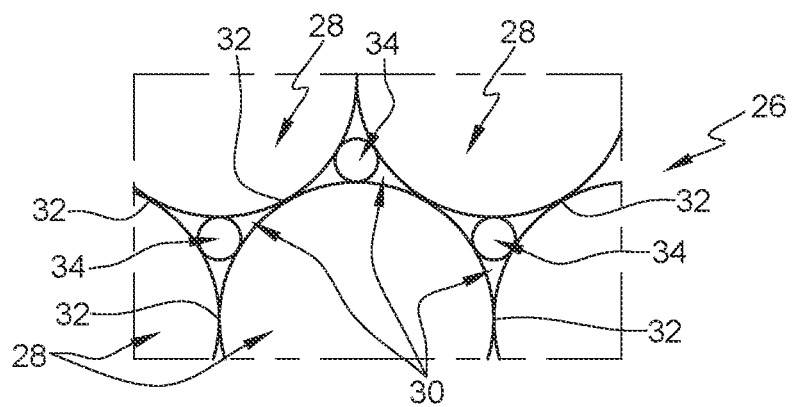
FIG. 3 is a view from above of a cellular structure of the acoustic treatment panel visible in FIG. 2.

According to a first embodiment visible, for example, in FIGS. 2 and 3, the cellular structure 26 comprises open tubes 34, positioned in the spacer zones 30, between the main tubes 28. These open tubes 34 are cylindrical and each have an axis parallel to the first direction or perpendicular to the acoustically resistive layer 22 or to the reflective layer 24. The open tubes 34 have a height (dimension measured parallel to the first direction) smaller than the height of the main tubes 28. The open tubes 34 are open at each end, a first end 34.1 being in contact with the second face 22.2 of the acoustically resistive layer 22 and connected thereto, a second end 34.2 being spaced apart from the reflective layer 24.

According to one configuration, the open tubes 34 all have the same diameter of between 0.3 and 1 mm and a height of between 5 and 25 mm According to one arrangement, each open tube 34 has the largest possible diameter while still allowing it to be positioned in a spacer zone 30. The open tubes 34 may all have the same height, greater than 5 mm, for example between 20 and 25 mm.

According to this second embodiment, the acoustically resistive layer 22 is perforated only in line with open tubes 34, in the spacer zones 30. Thus, the open tubes 34 have a funneling function in order to channel the sound waves into the spacer zones 30 which in turn have a resonator function.

Figure 4:
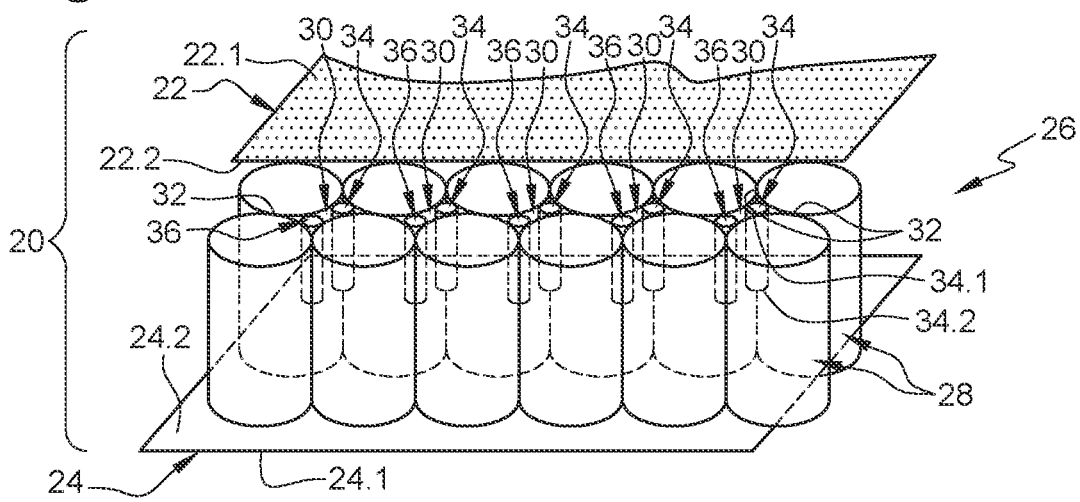
FIG. 4 is a perspective view of an acoustic treatment panel illustrating another embodiment of the invention.
Figure 6:
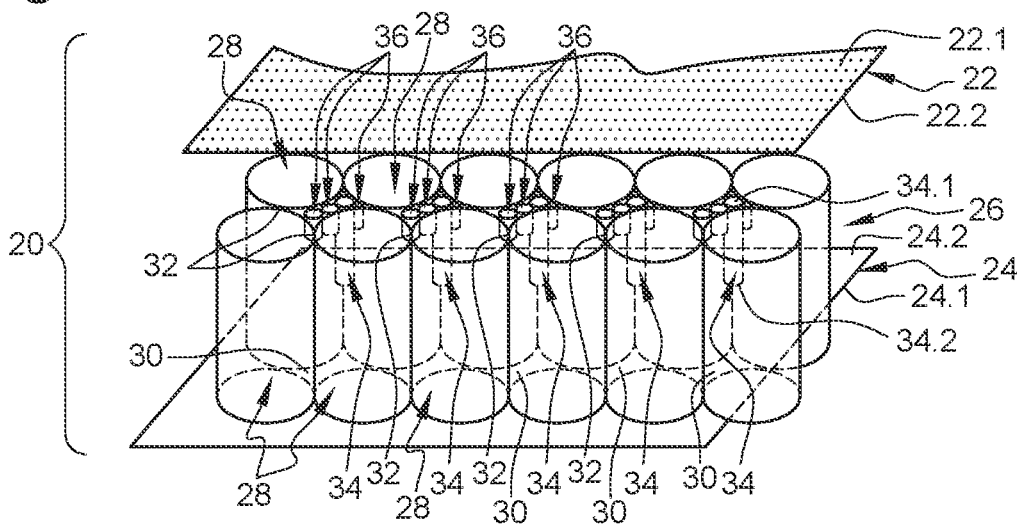
FIG. 6 is a perspective view of an acoustic treatment panel illustrating another embodiment of the invention.
Figure 7:
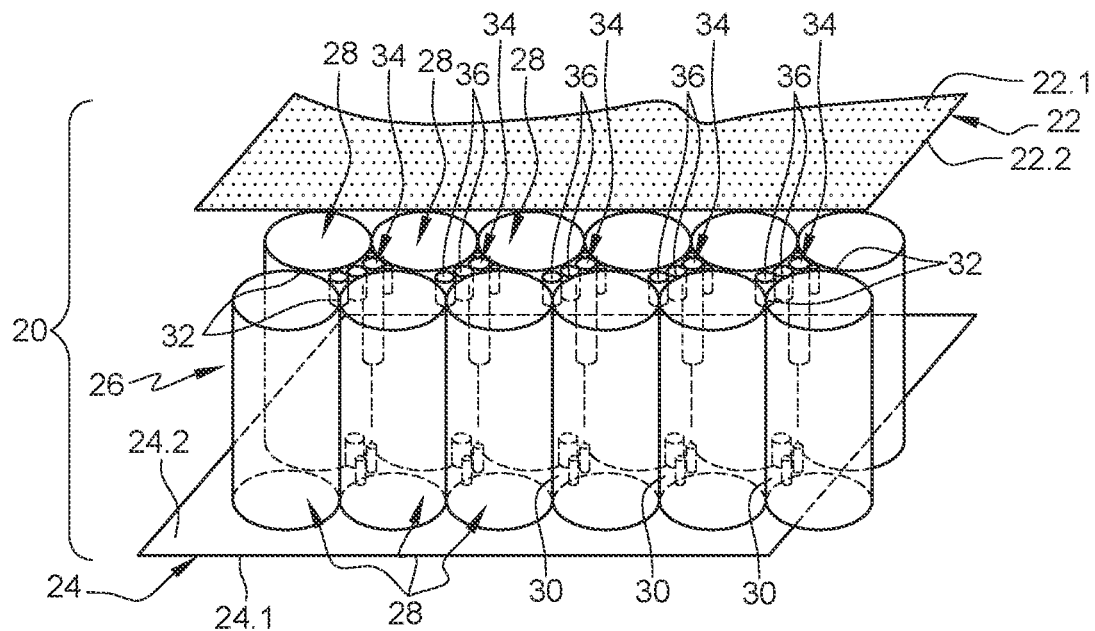
FIG. 7 is a perspective view of an acoustic treatment panel illustrating another embodiment of the invention.

According to the embodiments visible in FIGS. 4 and 6, the acoustically resistive layer 22 has through-orifices over an entire zone situated in line with at least one spacer zone 30 comprising an open tube 34. To close off these through-orifices, the resistive acoustic structure comprises closure tubes 36 positioned in the spacer zone 30, each closure tube 36 having at least one end closed by a transverse surface 36.1 pressed against the acoustically resistive layer 22. These closure tubes 36 are cylindrical and have axes parallel to the first direction or perpendicular to the acoustically resistive layer 22 or to the reflective layer 24.

A spacer zone 30 may comprise one closure tube 36, as illustrated in FIG. 4, or several closure tubes 36, as illustrated in FIG. 6. For at least one spacer zone 30, the number and dimensions of the closure tubes 36 are determined in such a way that the through-orifices situated in that zone of the acoustically resistive layer 22 which is situated in line with the spacer zone 30 and which is offset with respect to the open tube 34 are closed off by the transverse surface or surfaces 36.1 of the closure tube or tubes 36. Thus, the acoustically resistive layer 22 may be perforated over the entire zone situated in line with the spacer zones 30.

Figure 5:
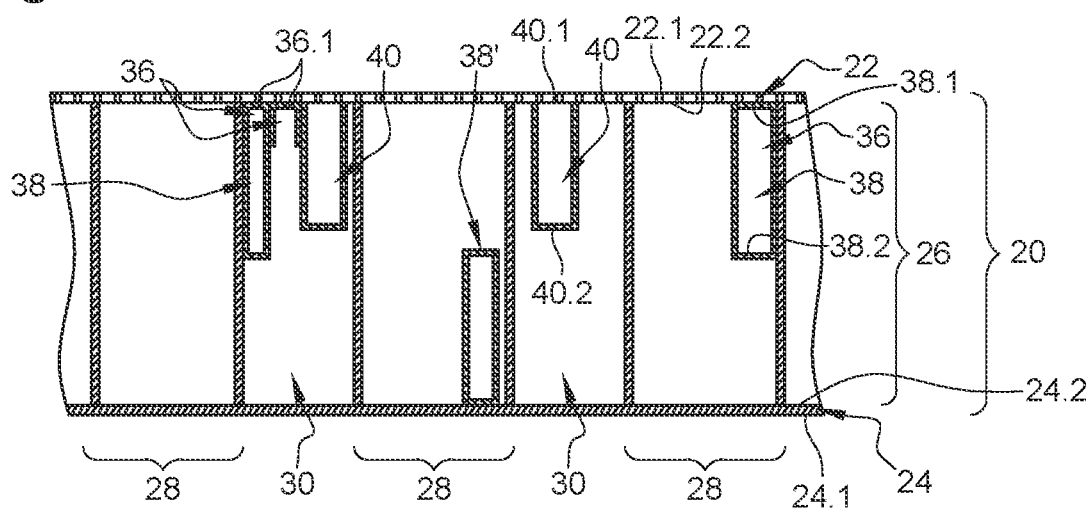
FIG. 5 is a cross section of an acoustic treatment panel illustrating another embodiment of the invention.

According to one embodiment visible in FIG. 5, the cellular structure 26 comprises at least one cylindrical closed tube 38, 38' which is closed off at each of its ends 38.1, 38.2 and which is positioned in a main tube 28 or in a spacer zone 30. Each closed tube 38, 38' is configured to modify the volume of the main tube 28 or of the spacer zone 30 in which it is situated. The diameter and the height of the closed tube 38, 38' are determined as a function of the volume desired for the main tube 28 or the spacer zone 30.

According to one configuration visible in FIG. 5, the closed tube 38 is positioned in a spacer zone 30 and has an end pressed against the acoustically resistive layer 22. In this case, in addition to modifying the volume of the spacer zone 30 in which it is situated, the closed tube 38 performs the function of a closure tube 36.

According to one configuration visible in FIG. 5, the closed tube 38' has an end pressed against the reflective layer 24. In this case, in addition to modifying the volume of the main tube 28 or of the spacer zone 30 in which it is situated, the closed tube 38' may have a structural function.

According to one arrangement, the closed tubes 38, 38' have different volumes from one another in order to vary the volumes of the main tubes 28 and/or of the spacer zones 30.

According to one embodiment visible in FIG. 5, the cellular structure 26 comprises at least one resonator tube 40, positioned in a spacer zone 30, between the main tubes 28. These resonator tubes 40 are cylindrical and each have an axis parallel to the first direction or perpendicular to the acoustically resistive layer 22 or to the reflective layer 24. The resonator tubes 40 have an open first end 40.1 in contact with the second face 22.2 of the acoustically resistive layer 22 and connected thereto, and a closed-off second end 40.2 spaced apart from the reflective layer 24. According to this embodiment, the resonator tube 40 performs the function of a Helmholtz resonator. The volume of each resonator tube 40 is determined as a function of the frequency of the sound waves to be attenuated.

According to other embodiments visible in FIGS. 2 and 8 to 10, the cellular structure 26 comprises cutouts 42, 44 made at the end of certain main tubes 28, in contact with the second face 24.2 of the reflective layer 24, in order to ensure the drainage function.

Figure 8:
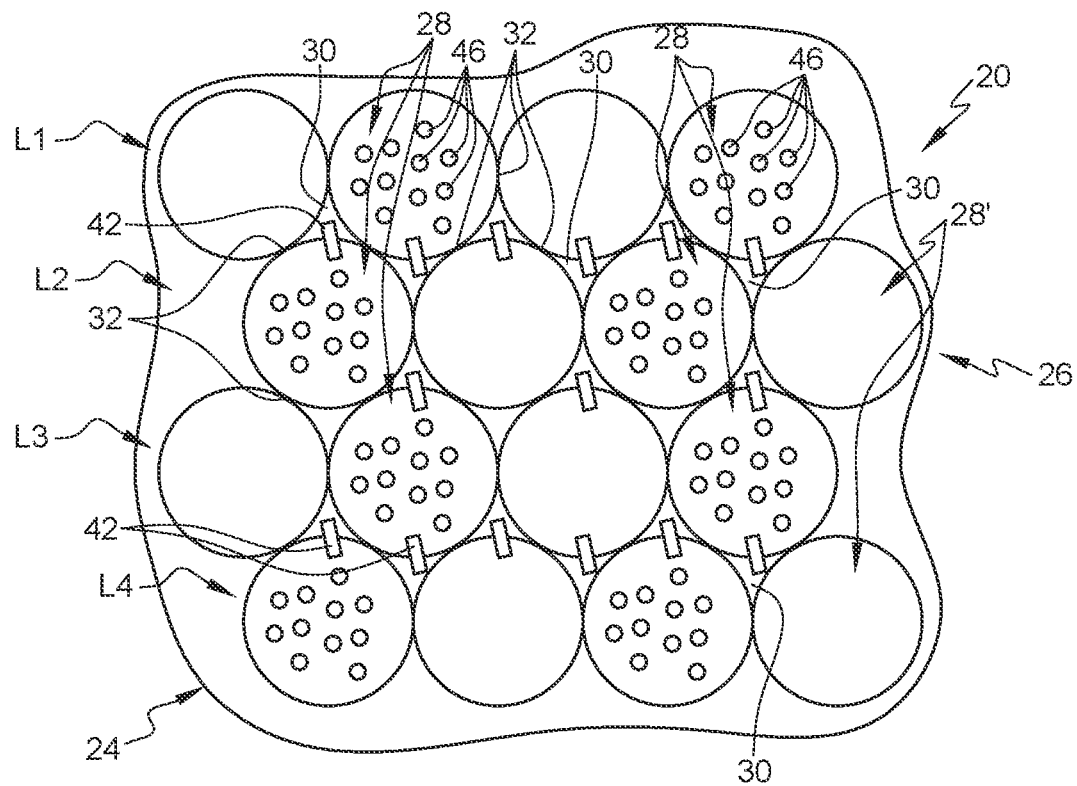
FIG. 8 is a view from above of an acoustic treatment panel illustrating another embodiment of the invention.
Figure 9:
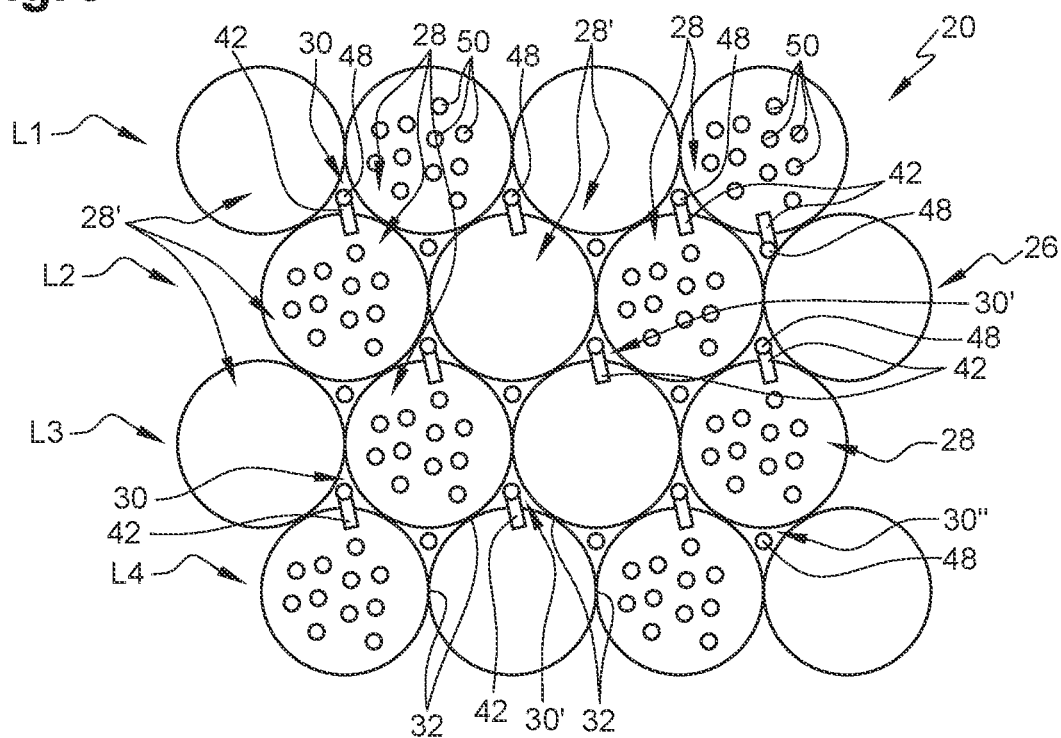
FIG. 9 is a view from above of an acoustic treatment panel illustrating another embodiment of the invention.

According to the embodiments visible in FIGS. 2, 8 and 9, each cutout 42 connects only a main tube 28 and a spacer zone 30.

According to one embodiment visible in FIG. 8, each main tube 28, 28' is connected by a cutout 42 to a spacer zone 30. In this case, the volume of a resonator corresponds to the sum of the volumes of a main tube 28, 28' and of a spacer zone 30. According to one configuration, the acoustically resistive layer 22 has through-orifices 46 only in line with certain main tubes 28. The main tubes 28, 28' are arranged in alternating fashion in several rows L1 to L4, the acoustically resistive layer 22 having through-orifices 46 solely in line with one out of every two main tubes 28 for each row L1 to L4.

By way of example, the main tubes 28 have a diameter of the order of 10 mm and a height of the order of 25 mm. The through-orifices 46 are configured to obtain an open area ratio of the order of 4%. In this case, the resonators formed by the main tubes 28, each associated with a spacer zone 30, make it possible to attenuate sound waves having a frequency of about 600 to 700 Hz.

According to another embodiment visible in FIG. 9, the acoustically resistive layer 22 has at least one through-orifice 48 in line with each spacer zone 30, 30', 30" and through-orifices 50 in line with certain main tubes 28. The acoustically resistive layer 22 comprises no through-orifice in line with certain main tubes 28'. According to one configuration, the main tubes 28, 28' are arranged in alternating fashion in several rows L1 to L4, the acoustically resistive layer 22 having through-orifices 50 solely in line with one out of every two main tubes 28 for each row L1 to L4.

The cellular structure 26 comprises at least one spacer zone 30 connected by a cutout 42 to a main tube 28 situated in line with through-orifices 50 of the acoustically resistive layer 22, at least one spacer zone 30' connected by a cutout 42 to a main tube 28' situated in line with a non-perforated zone of the acoustically resistive layer 22 and at least one spacer zone 30" which does not communicate with any main tubes.

According to this embodiment, the cellular structure 26 comprises:
first resonators each having a volume equal to the sum of the volumes of a spacer zone 30 and of a main tube 28, the acoustically resistive layer 22 having through-orifices 50 in line with the spacer zone 30 and the main tube 28 of each first resonator;
second resonators each having a volume equal to the sum of the volumes of a spacer zone 30 and of a main tube 28', the acoustically resistive layer 22 having at least one through-orifice 50 in line with the spacer zone 30 and none in line with the main tube 28' of each second resonator;
third resonators each having a volume equal to a volume of a spacer zone 30.

By way of example, the main tubes 28, 28' have a diameter of the order of 10 mm and a height of the order of 30 mm. The through-orifices 50 are configured to obtain an open area ratio of the order of 4%. In this case, the resonators formed by the main tubes 28 make it possible to attenuate sound waves having a frequency of about 450 Hz.

According to another embodiment visible in FIG. 10, the cellular structure 26 comprises several cutouts 44 in the form of grooves.

According to one arrangement, the main tubes 28 are arranged in rows L1 to L4 and columns C1 to C3 perpendicular to the rows L1 to L4. The cellular structure 26 comprises an open tube 34 in each spacer zone 30. The acoustically resistive layer 22 comprises through-orifices 52 in line with all of the main tubes 28 of all of the even-numbered rows L2, L4 and none in line with any of the main tubes 28' of the odd-numbered rows L1, L3.

The grooves 44 are oriented in an oblique manner with respect to the rows L1 to L4 or columns C1 to C3 and allow a spacer zone 30, a main tube 28 in line with which through-orifices 52 are provided, a spacer zone 30 and a main tube 28' in line with a non-perforated zone of the acoustically resistive layer 22 to communicate successively.

By way of example, the main tubes 28 have a diameter of the order of 10 mm and a height of the order of 30 mm. The open tubes 34 have a diameter of the order of 4 mm. The through-orifices 52 are configured to obtain an open area ratio of the order of 4%. In this case, the resonators formed by the main tubes 28 make it possible to attenuate sound waves having a frequency of about 700 Hz.

Of course, the invention is not restricted to the embodiments indicated above. Thus, the cellular structure 26 may comprise at least one combination of main tubes 28, of cutouts 42, 44 and of secondary tubes from among the open tubes 34, the resonator tubes 40, the closure tubes 36 and the closed tubes 38, which are positioned in the main tubes 28 and/or in the spacer zones 30. Moreover, the cellular structure 26 may comprise a first combination of these elements in a given zone allowing sound waves of a first frequency to be attenuated, and at least one other combination of these elements in at least one other zone allowing sound waves of a second frequency to be attenuated.

Irrespective of the embodiment, the cellular structure 26 comprises cylindrical main tubes 28 which have a first end closed by the acoustically resistive layer 22 and a second end closed by the reflective layer 24, the main tubes 28 being arranged in several rows and in contact with one another so as to delimit between them spacer zones 30 which are sealed relative to one another. In addition, the cellular structure 26 comprises cutouts 42, 44 each connecting at least one main tube 28 and at least one spacer zone 30, and also secondary tubes from among the open tubes 34, the resonator tubes 40, the closure tubes 36 or the closed tubes 38, which are positioned in the main tubes 28 and/or in the spacer zones 30, the cutouts 42, 44 and/or the secondary tubes being configured to generate acoustic cells of different dimensions from identical main tubes 28. Thus, it is possible to widen the range of frequencies attenuated by the acoustic treatment panel 20.

According to a non-limiting application, an aircraft comprises at least one acoustic treatment panel 20 according to the invention, for example positioned in the nacelle of a propulsion assembly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic treatment panel comprising
at least one porous acoustically resistive layer,
an impermeable reflective layer, and
at least one cellular structure interposed between the acoustically resistive layer and the reflective layer,
wherein the cellular structure comprises cylindrical and identical main tubes which have a first end closed by the acoustically resistive layer and a second end closed by the reflective layer, the main tubes being arranged so as to delimit between them spacer zones which are sealed relative to one another, and
wherein the cellular structure comprises
secondary tubes positioned in at least one of the main tubes or in the spacer zones,
the secondary tubes being configured to generate acoustic cells of different dimensions from identical main tubes,
wherein the secondary tubes comprise cylindrical closure tubes positioned in the spacer zones, each closure tube having at least one end closed by a transverse surface pressed against the acoustically resistive layer.

2. The acoustic treatment panel as claimed in claim 1, wherein the secondary tubes comprise cylindrical open tubes positioned in the spacer zones, each open tube having a first open end in contact with the acoustically resistive layer and a second open end spaced apart from the reflective layer.

3. The acoustic treatment panel as claimed in claim 2, wherein the main tubes have a diameter of between 10 and 20 mm and a height of between 25 and 40 mm, and wherein the open tubes have a diameter of between 0.3 and 1 mm and a height of between 5 and 25 mm.

4. The acoustic treatment panel as claimed in claim 2,
wherein the secondary tubes comprise cylindrical closure tubes positioned in the spacer zones, each closure tube having at least one end closed by a transverse surface pressed against the acoustically resistive layer,
wherein the acoustically resistive layer has through-orifices over an entire zone situated in line with at least one spacer zone comprising an open tube, and
wherein a number and dimensions of the closure tubes positioned in the spacer zone are determined such that the through-orifices situated in that zone of the acoustically resistive layer which is situated in line with the spacer zone and which is offset with respect to the open tube are closed off by the transverse surface or surfaces of the closure tube or tubes.

5. The acoustic treatment panel as claimed in claim 1, wherein the secondary tubes comprise at least one cylindrical closed tube which is closed off at each of its ends and which is positioned in a main tube or in a spacer zone, the closed tube having dimensions determined as a function of a volume desired for the main tube or the spacer zone in which it is situated.

6. The acoustic treatment panel as claimed in claim 5, wherein the closed tube has an end pressed against the acoustically resistive layer or the reflective layer.

7. The acoustic treatment panel as claimed in claim 1, wherein the secondary tubes comprise at least one cylindrical resonator tube which is positioned in a spacer zone and which has an open first end, connected to the acoustically resistive layer, and a closed-off second end.

8. An aircraft comprising at least one acoustic treatment panel as claimed in claim 1.

9. An acoustic treatment panel comprising
at least one porous acoustically resistive layer,
an impermeable reflective layer, and
at least one cellular structure interposed between the acoustically resistive layer and the reflective layer,
wherein the cellular structure comprises cylindrical and identical main tubes which have a first end closed by the acoustically resistive layer and a second end closed by the reflective layer, the main tubes being arranged so as to delimit between them spacer zones which are sealed relative to one another, and
wherein the cellular structure secondary tubes positioned in at least one of the main tubes or in the spacer zones, the secondary tubes being configured to generate acoustic cells of different dimensions from identical main tubes,
wherein the secondary tubes comprise cylindrical open tubes positioned in the spacer zones, each open tube having a first open end in contact with the acoustically resistive layer and a second open end spaced apart from the reflective layer.

10. An acoustic treatment panel comprising
at least one porous acoustically resistive layer,
an impermeable reflective layer, and
at least one cellular structure interposed between the acoustically resistive layer and the reflective layer,
wherein the cellular structure comprises cylindrical and identical main tubes which have a first end closed by the acoustically resistive layer and a second end closed by the reflective layer, the main tubes being arranged so as to delimit between them spacer zones which are sealed relative to one another, and
wherein the cellular structure comprises secondary tubes positioned in at least one of the main tubes or in the spacer zones, the secondary tubes being configured to generate acoustic cells of different dimensions from identical main tubes,
wherein the secondary tubes comprise at least one cylindrical resonator tube which is positioned in a spacer zone and which has an open first end, connected to the acoustically resistive layer, and a closed-off second end.

* * * * *